UNITED STATES PATENT OFFICE.

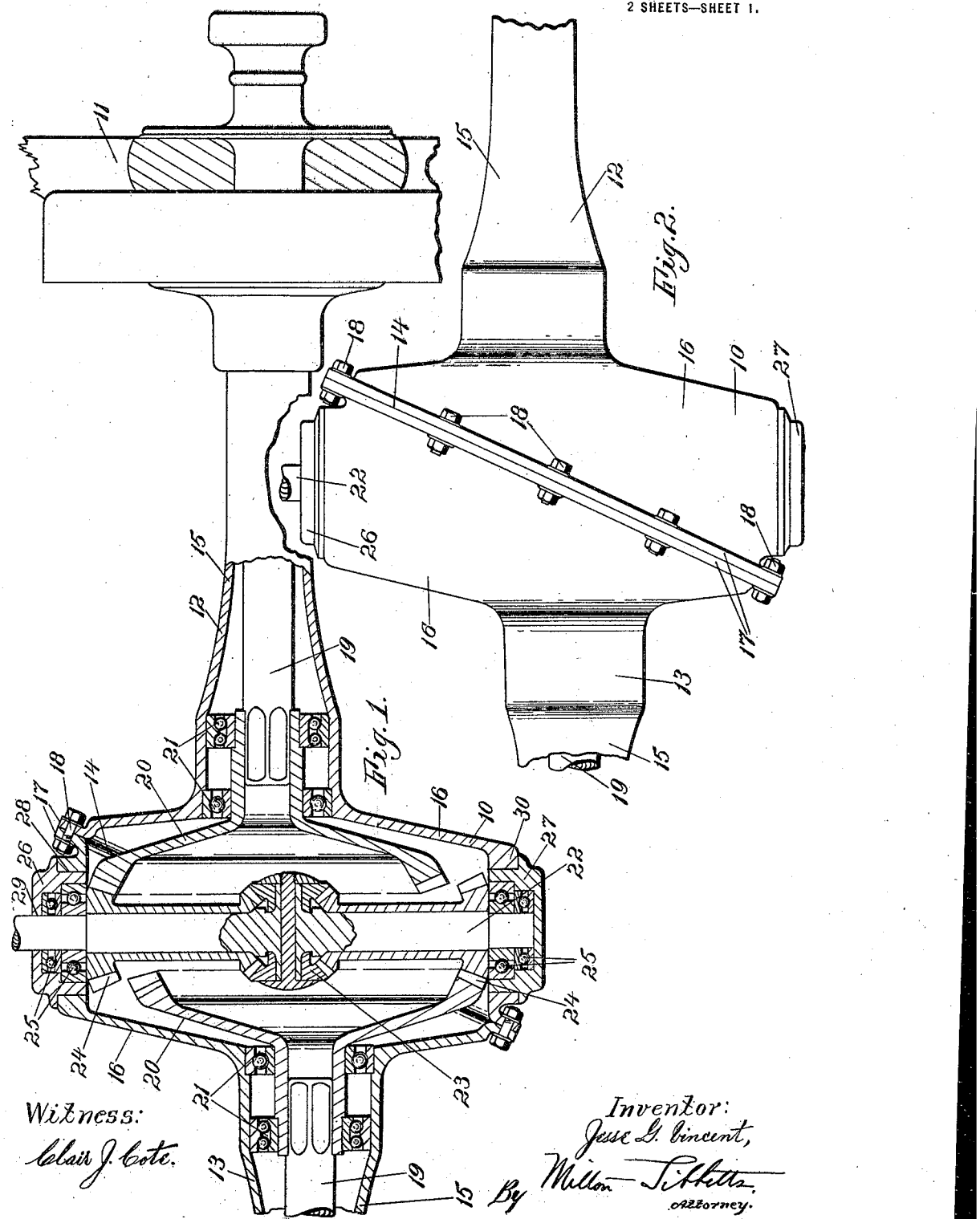

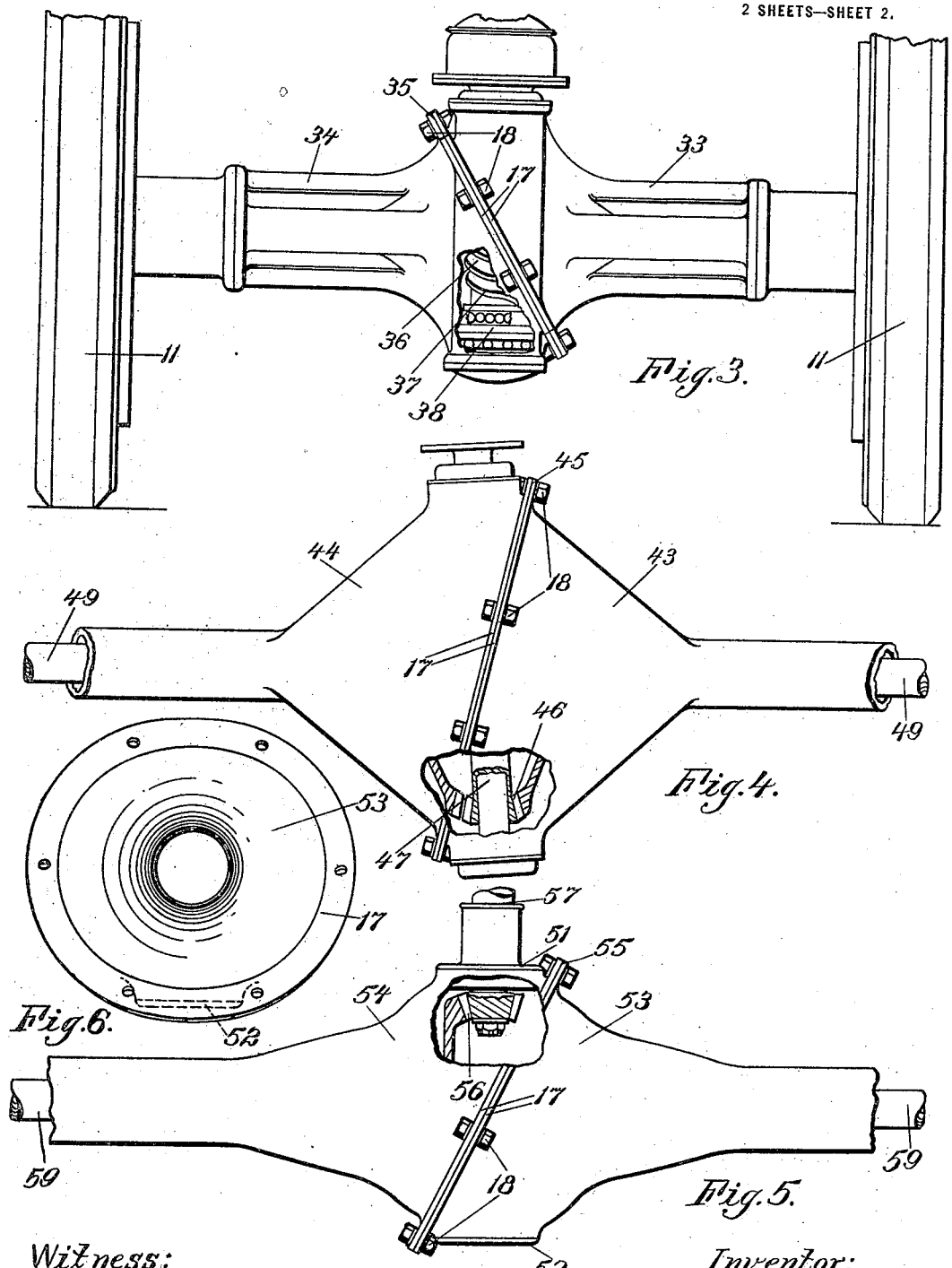

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,399,093.  Specification of Letters Patent.  Patented Dec. 6, 1921.

Application filed February 10, 1916. Serial No. 77,454.

*To all whom it may concern:*

Be it known that I, JESSE G. VINCENT, a citizen of the United States, and resident of Detroit, Wayne county, State of Michigan, have invented certain new and useful Improvements in Motor-Vehicles, of which the following is a specification.

This invention relates to motor vehicles and particularly to the axles thereof.

One of the objects of the invention is to provide a simplified form of axle, and particularly one in which the casing is formed in two parts which are exactly alike or symmetrical so that the two parts may be cast in the same mold or formed with the same dies, and passed through the same machining operations.

Another object of the invention is to provide a two-part axle casing divided at the middle, with a transverse driving shaft having two separated bearings, each of which is wholly supported in one of the axle casing parts.

Other objects and the features of novelty of the invention will appear from the following description taken in connection with the drawings which form a part of this specification, and in which—

Figure 1 is a horizontal longitudinal section and part plan view of a motor vehicle axle embodying this invention;

Fig. 2 is a plan view of the axle shown in Fig. 1;

Figs. 3, 4 and 5 are plan views of three other forms of the invention; and

Fig. 6 is an end view of one of the axle casing parts or members.

Referring to the drawings, 10 represents an axle casing as a whole, which casing is of tubular form enlarged at the middle to receive the gearing, and having wheels 11 mounted at its outer ends. In Figs. 1 and 2, the casing 10 comprises right and left halves or members 12 and 13 joined at 14 in a vertical plane that is diagonal to the axis of the axle. In other words, the joint is in a diagonal plane, an element of which cuts the axis of the axle substantially at a right angle. The axis of the axle is assumed to be the axis about which the wheels 11 revolve, or if the axes of said wheels are offset as in Figs. 1 and 2, it may be a parallel line midway between the axes of the wheels.

It is intended that the casing members 12 and 13 shall be exactly the same in form, comprising as each of them does, a tubular portion 15, an enlarged inner end 16, and a circular flange 17 upon said inner end. The tubular portions 15 of the respective casing members are offset slightly relative to each other, as will be clearly seen in Figs. 1 and 2, and the members are detachably connected together by bolts 18 passing through their flanges 17, the offset being to permit the use of the particular form of gearing hereinafter described.

Within the casing 10 are mounted axle or shaft sections 19, upon the inner ends of which gears 20 are mounted or connected. Each of these shafts 19, and its respective gear, is supported independently of the other in bearings 21 at the inner end of one of the casing members 12, 13, and it will be understood that the outer ends of the shaft sections are suitably connected to the wheels 11, for driving the latter.

Arranged between the gears 20 and the inner ends of the shafts 19 is a transverse driving shaft 22, upon which is mounted a differential gearing 23 and bevel driving pinions 24, the latter being in mesh respectively with the gears 20, as will be clearly seen in Fig. 1. This arrangement of gears provides a differential driving connection between the driving shaft 22 and the shaft sections 19.

The driving shaft 22 is supported in the casing 10 in suitable radial and thrust bearings 25, there being two of these bearings separated and mounted in bearing supports 26 and 27 at the front and rear of the casing 10 respectively. The bearing support 26 is mounted in a front opening 28 in the enlarged part 16 of the casing member 13, and it is provided with an opening 29 through which the driving shaft 22 passes, while the bearing support 27 is mounted in an opening 30 in the enlarged portion 16 of the casing member 12. This bearing support 27 also forms a cap for completely closing the opening 30.

From the above description, it will be seen that the bearings 25 are in alinement and that they support the driving shaft 22 in both of the casing members 12 and 13. It is evident also that the axis of the transverse driving shaft 22 is at a right angle to the axis of the axle; yet each of the bearing supports 26, 27, is wholly mounted in one of the axle members 12, 13.

Referring to Fig. 3, it will be seen that a worm drive axle is illustrated. The casing members 33, 34 are symmetrically formed and are diagonally joined as at 35. Within the casing is worm gearing 36, which includes a transverse worm shaft 37 supported in a pair of separated bearings 38 in the casing. These bearings may be similar to the bearings 25 shown in Fig. 1, and it will be understood that one of them is in each of the casing members 33, 34.

In Fig. 4, both the joint 45 between the casing members 43 and 44, and the axis of the transverse driving shaft 47 are arranged diagonally of the axis of the axle. Suitable bevel gearing 46 connects the driving shaft 47 with the shaft sections 49. By arranging the driving shaft 47 at slightly less than a right angle to the axis of the axle, and at an acute angle to the plane of the joint between the casing members, suitable clearance is permitted for the gearing 46 as shown in the cutaway portion of Fig. 4, and a lesser angle of the joint between the casing members is permitted while still maintaining the mounting of the driving shaft bearings in the two parts of the casing.

In Fig. 5, the symmetrical parts 53 and 54 of the axle casing are joined at 55 and a single pair of bevel gears 56 are employed to transmit the drive from the transverse driving shaft 57 to the shaft sections 59. In this construction, the bearing support 51 closes the opening at the front of the casing, and a cap 52 closes the opening at the rear of the casing.

Other forms may be made also without departing from the spirit or scope of the invention.

Having thus described my invention, what I claim and desire to secure by Letters Patent is:—

1. In a vehicle axle, the combination with driving and driven shafts, of a rigid casing having relatively fixed bearings therefor, said casing comprising symmetrical members diagonally joined together.

2. In a vehicle axle, the combination with driving and driven shafts, of a rigid casing having relatively fixed bearings therefor, said casing comprising members diagonally joined together, each member having a shaft bearing therein.

3. In a vehicle axle, the combination with driving and driven shafts, of a rigid casing having relatively fixed bearings therefor, said casing comprising two symmetrical members each enlarged at one end and joined together in a diagonal plane at such enlarged ends.

4. In a vehicle axle, the combination with driving and driven shafts, of a rigid casing having relatively fixed bearings therefor, said casing comprising two members having a joint in a plane diagonal to both members, and means detachably connecting said members.

5. In a vehicle axle, the combination with driving and driven shafts, of a rigid casing having relatively fixed bearings therefor, said casing comprising two members detachably connected together, the joint between said members being in a plane diagonal to both members.

6. In a vehicle axle, the combination with driving and driven shafts, of a rigid casing therefor comprising two members detachably joined, the joint being in a vertical plane diagonal to the axis of the axle.

7. In a vehicle axle, the combination with driving and driven shafts, of a rigid casing therefor comprising two members detachably joined, the joint being in a diagonal plane, a vertical element of which cuts the axis of the axle substantially at a right angle.

8. A vehicle driving axle comprising two members having a joint in a diagonal plane, means detachably connecting said members, and alined bearings, one in each member, for a transverse shaft.

9. A driving axle casing comprising two members each having a tubular portion and an enlarged end, and means joining said enlarged ends with the axes of the tubular portions offset.

10. A driving axle casing comprising two symmetrical members each having a tubular portion and an enlarged end, and means joining said members diagonally at the enlarged ends with the axes of the tubular portions offset.

11. A driving axle casing comprising two symmetrical members each having a tubular portion and an enlarged end, bearings for a transverse shaft in said casing, one of said bearings in each member, and means joining said enlarged ends with the axes of the tubular portions offset.

12. A driving axle casing comprising two symmetrical members each having a tubular portion and an enlarged end, bearings in said casing, one in each member, and means joining said members diagonally at the enlarged ends with the axes of the tubular portions offset.

13. In an axle, in combination, a casing formed of two members joined in a diagonal plane, shaft sections mounted independently in said members, and a transverse driving shaft connected to drive said shaft sections and having bearings in both said members.

14. In an axle, in combination, a casing formed of two members joined in a diagonal plane, shaft sections mounted in said casing, and a transverse driving shaft connected to drive said shaft sections and having bearings in both said members.

15. In an axle, in combination, a casing formed of two members joined at the middle in a diagonal plane, said casing having alined openings one in each member, bearing supports secured to the members in said openings, bearings in said supports, shaft sections mounted in the casing, and a transverse driving shaft supported in said bearings and connected to drive said shaft sections.

16. In an axle, in combination, a casing formed of two members joined at the middle in a diagonal plane, said casing having alined openings one in each member, a bearing support secured to a member in one of said openings, a bearing in said support, a cap over the other said opening, shaft sections mounted in the casing, and a transverse driving shaft in said bearing and connected to drive said shaft sections.

17. In an axle, in combination, a casing formed of two members joined at the middle in a diagonal plane, bearings in each of said members, the bearings of one member being offset relative to those of another, shaft sections mounted in said bearings, a driving shaft arranged at a right angle to said shaft sections and connected to drive the same, and bearings in said casing for said driving shaft.

18. In an axle, in combination, a casing formed of two members joined at the middle in a diagonal plane, bearings in each of said members, the bearings of one member being offset relative to those of another, shaft sections mounted in said bearings, a driving shaft arranged at a right angle to said shaft sections and connected to drive the same, and alined bearings, one in each member, for said driving shaft.

19. In an axle, in combination, a casing formed of two members joined at the middle in a diagonal plane, bearings in each of said members, the bearings of one member being offset relative to those of another, shaft sections mounted in said bearings, a driving shaft arranged at a right angle to and between the inner ends of said shaft sections, differential and bevel gearing connecting said driving shaft and said shaft sections, and alined bearings, one in each member, for said driving shaft.

20. In an axle, in combination, a casing formed of two members joined in a diagonal plane, said casing having front and rear alined openings, one in each member, gearing in said casing, a driving shaft connected to said gearing and mounted in a bearing in the front opening, and a cap over the rear opening.

21. In a vehicle axle, the combination with driving and driven shafts, of a rigid casing therefor comprising symmetrical members diagonally joined together, said diagonal joint completely encircling the axle.

22. In a vehicle axle, the combination with driving and driven shafts, of a rigid casing therefor comprising members diagonally joined together, each member making a complete surrounding joint and having one of the shaft bearings.

23. In a vehicle axle, the combination with driving and driven shafts, of a rigid casing therefor comprising two members having an unbroken joint in a plane diagonal to both members and means detachably connecting said members.

24. In a vehicle axle, the combination with a driving shaft and a right angle driven shaft, of a rigid casing having relatively fixed bearings for said shafts, said casing comprising opposite extending members diagonally joined together.

In testimony whereof I affix my signature.

JESSE G. VINCENT.